Figure 1:
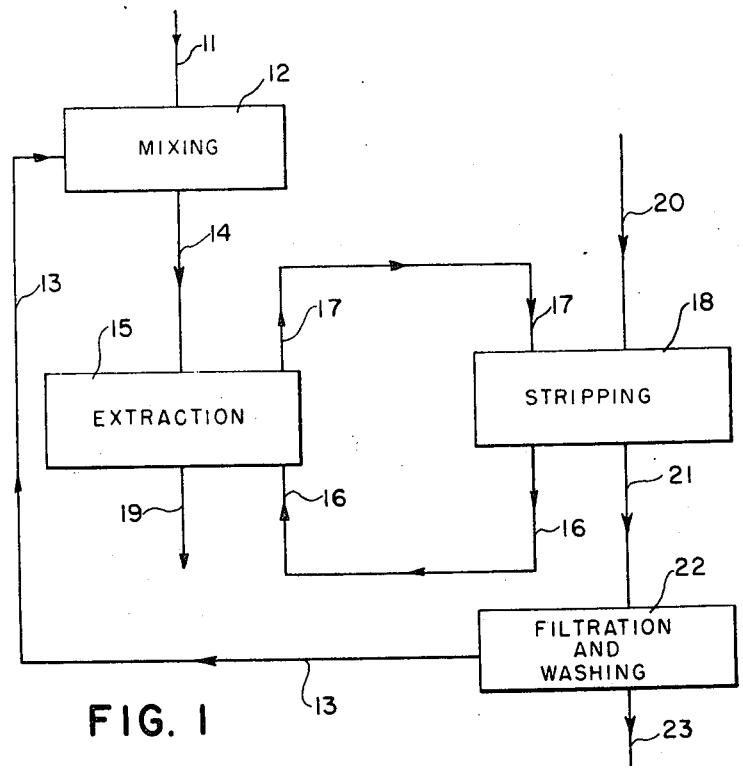

United States Patent [19]

Blanco et al.

[11] 3,976,742
[45] Aug. 24, 1976

[54] METAL EXTRACTION PROCESS USING QUATERNARY AMMONIUM THIOCYANATES

[75] Inventors: Jose A. Blanco, Welland; Gregory G. Wortman, Walden; Juraj Babjak, Welland; Irwin J. Itzkovitch, Willowdale, all of Canada

[73] Assignee: The International Nickel Company, Inc., New York, N.Y.

[22] Filed: Mar. 6, 1975

[21] Appl. No.: 556,130

[30] Foreign Application Priority Data
Mar. 18, 1974  Canada ................................ 195212

[52] U.S. Cl. .................................. 423/24; 423/100; 423/139
[51] Int. Cl.² ...................... C01G 3/00; C01G 9/00; C01G 51/00; C01G 53/00
[58] Field of Search ...................... 423/24, 100, 139; 75/101 BE

[56] References Cited
UNITED STATES PATENTS
3,194,652   7/1965   Clifford et al. .................. 75/101 BE OTHER PUBLICATIONS
Wilson et al., *Analytical Chemistry*, vol. 35, No. 3 Mar. 1963 pp. 302–307.
Moore, F. L., *Analytical Chemistry*, vol. 36, No. 11, Oct. 1964 pp. 2158–2162.
*Chemical Abstracts* vol. 59, No. 2221e.
*Chemical Abstracts* vol. 61 (1964) No. 7680h.
*Analytica Chimica Acta*.38 (1967) pp. 547–552.
*Journal of Chromatography* 53(1970) pp. 345–353.

*Primary Examiner*—Oscar R. Vertiz
*Assistant Examiner*—Brian E. Hearn
*Attorney, Agent, or Firm*—Francis J. Mulligan, Jr.; Ewan C. MacQueen

[57] ABSTRACT

An improvement in the process of extracting metal from aqueous acidic solution using a quaternary ammonium thiocyanate extractant wherein a special amount of thiocyanate ion is introduced into the aqueous solution prior to or contemporaneously with the extraction. Results achieved are better extractions with little or no additional loss of thiocyanate ion in the aqueous raffinate.

12 Claims, 2 Drawing Figures

METAL EXTRACTION PROCESS USING QUATERNARY AMMONIUM THIOCYANATES

The present invention is concerned with a process for extracting metals such as cobalt, copper, zinc and iron from aqueous solution employing a quaternary ammonium thiocyanate liquid ion exchange extractant and more particularly with extracting such metals from nickel-containing aqueous solutions.

The use of quaternary ammonium thiocyanate compounds for selectively extracting cobalt, copper, zinc, ferric iron and other elements from aqueous nickel-containing solutions to provide purified aqueous nickel solutions is disclosed in U.S. Pat. No. 3,194,652 to W. E. Clifford et al. There are a number of other disclosures related principally to analytical chemistry which teach the use of organic extractants along with quantities of thiocyanate ion in aqueous media in order to separate out cobalt, copper and other ions. Generally speaking these disclosures do not relate to any commercially practical means for purifying nickel solutions which advance beyond the teachings of the Clifford et al patent.

In particular the prior art does not teach any means for treating an aqueous acidic solution to remove copper, cobalt, zinc, ferric iron and similar ions without seriously contaminating the raffinate with thiocyanate ion. One disclosure in particular mentions that contamination with thiocyanate ion is "a minor problem because the aqueous thiocyanate can be removed by ion exchange or destroyed by boiling with nitric acid." While this quoted statement may be true for analytical chemistry purposes, costs associated with thiocyanate ion loss or recovery can be a major factor in nickel purification when carried out on an industrial scale.

It is an object of the present invention to provide a process whereby improved extraction of cobalt, copper, zinc and iron from aqueous feeds can be attained without contaminating the raffinate with excess thiocyanate ion.

Figure 2:
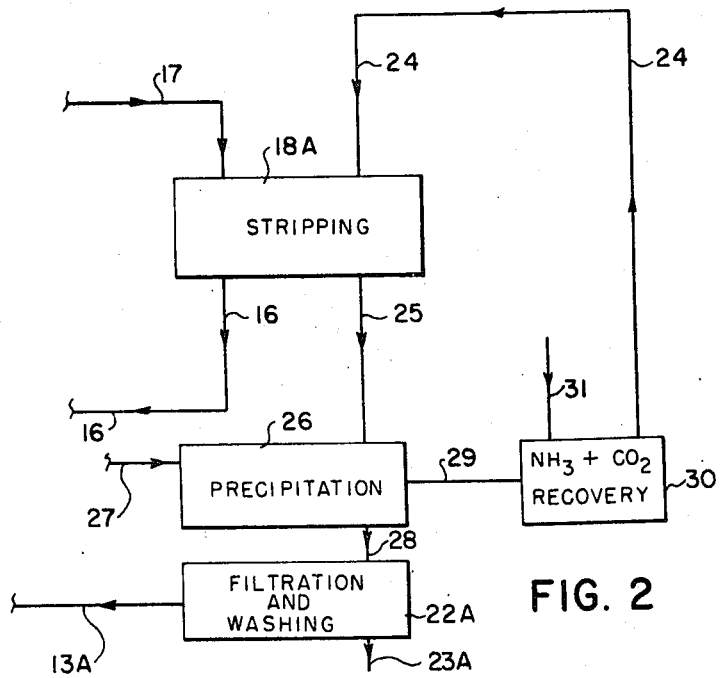

Other objects and advantages will become apparent from the following description taken in conjunction with the drawing in which FIG. 1 is a flow diagram depicting schematically the process of the present invention and FIG. 2 depicts an alternative means of stripping metal from the organic phase.

Generally speaking, the present invention contemplates a process for extracting extractable metals, i.e., particularly cobalt, copper, zinc and ferric iron but also trivalent bismuth, cadmium, divalent mercury, trivalent indium, divalent palladium, quadrivalent tin, hexavalent uranium and hexavalent molybdenum, from an aqueous acidic solution (aqueous phase) containing ions of at least one of the extractable metals wherein an amount of thiocyanate ion less than about that amount in moles stoichiometrically equivalent to said metals as defined by the relationship $$[SCN^-] = \Sigma \, a \, [Me^A]$$

wherein
[$SCN^-$] is the molar concentration of thiocyanate ion;
$\Sigma$ is the summation operator;
[$Me^A$] is the molar concentration of any given extractable metal species having the positive valence of $A$; and
$a$ is a multiplying factor numerically equivalent to $A$ said relationship simplifying in the case of the extractable metals of most interest to $$[SCN^-] = 2[Co + Cu + Zn] + 3[F_E]$$

is included in solution in the aqueous phase, the organic phase comprises a water-insoluble quaternary ammonium thiocyanate or a solution of a water-insoluble quaternary ammonium thiocyanate in a water-immiscible-solvent, and at least once the organic phase and aqueous phase are brought into contact for a time sufficient to effect extraction across the interface and the phases are then separated. Thereafter the extracted metal is recovered from the organic phase, advantageously in a manner so as to simultaneously reform the quaternary ammonium thiocyanate, which is then recycled to contact additional aqueous phase and recover thiocyanate ion in aqueous solution for recycling into additional aqueous phase. Aqueous solutions of alkalis, e.g., sodium hydroxide, or Caron's solution, or aqueous ammonia can be used to strip metal from the organic phase.

While the process of the present invention is particularly pertinent to the purification of aqueous, acidic nickel solutions, especially nickel solutions obtained during the hydrometallurgical recovery of nickel from ores, residues etc., because under the conditions prevailing in the process the great bulk of nickel remains in the aqueous phase, the process is applicable to any situation where it is desirable to remove cobalt, copper, zinc, ferric iron or other extractable metal from aqueous acidic solution. Applying the process of the present invention to the purification of nickel-containing solutions contaminated with cobalt, copper and zinc it is practical to produce an aqueous raffinate having ratios of nickel to cobalt of greater than 5000 and ratios of nickel to copper and nickel to zinc greater than 10,000. While the present invention is most applicable to acidic nickel sulfate solutions containing any or all of the metallic contaminants cobalt, copper, zinc and iron, the process described herein can also be applied to chloride or nitrate solutions or to solutions containing a mixture of these anions. The pH of the aqueous solution being treated can be in a wide acidic range but must be below the nickel precipitation point (about pH = 6) and also below the precipitation point of any of the metallic contaminants co-present. Advantageously, the pH of the aqueous feed solution is in the range of about 2 to about 6. Below a pH of about 2 thiocyanate ion will slowly decompose.

The organic phase advantageously comprises a solution of methyl tri-capryl ammonium thiocyanate in a water-immiscible solvent where the solvent, e.g., a xylene mixture, comprises up to about 95% by volume of the mixture. The methyl tri-capryl ammonium thiocyanate is made by equilibrating a commercial grade of methyl tri-capryl ammonium chloride, advantageously dissolved in a water-immiscible solvent, with an aqueous solution containing thiocyanate ions. One commercial grade of methyl tri-capryl ammonium chloride is sold under the trade designation Aliquat 336 by General Mills, Chemical Division. The equilibrated, thiocyanate product of this commercial material is identified herein as Aliquat thiocyanate. Other water-insoluble quaternary ammonium thiocyanates can also be used. To provide water-insolubility, the quaternary ammonium compound should have at least two long alkyl groups attached to the central nitrogen atom each alkyl group having carbon chains with eight atoms or more. Another commercial source for quaternary ammonium salts which can be equilibrated to form the thiocyanate salt is Armour Industrial Chemical Company which supplies under the name Arquad 2C a dialkyl dimethyl ammonium chloride in which the two alkyl groups each have a carbon chain length varying from eight to eighteen and averaging about twelve.

Advantageous water-immiscible solvents for the quaternary ammonium thiocyanates include methyl isobutyl ketone, (MIBK), mixed xylenes, hereinafter referred to as xylene, and Super Varnish Makers' and Painters' Naphtha, a high quality naphtha, hereinafter referred to as SVMPN. MIBK has appreciable solubility in aqueous solution. It can, however, be removed completely by batch distillation. Xylene is much less soluble than MIBK in aqueous solutions and is substantially less expensive. SVMPN, which is a product of the Shell Chemical Company, is somewhat less effective than xylene but is still less expensive. Commercially available mixtures of aromatic compounds (solvents) other than xylene can also be used with advantage. Substantially water-insoluble alcohols or mixtures of such alcohols with the aforementioned solvents are also useful as solvents for the quaternary ammonium compounds. The choice of solvent and quaternary ammonium thiocyanate basically dictate the most effective concentration of quaternary compound. In some cases the quaternary compound can be used undiluted but in most instances substantial amounts of solvent are used to provide the correct viscosity for use in the equipment avialable and to minimize entrainment losses of the valuable quaternary ammonium compound. For use in mixer-settlers a 30% by volume concentration of Aliquat thiocyanate in a commercially available mixture of aromatic species sold under the trade designation Shell TS34 has been found to be practical.

As stated hereinbefore the aqueous phase treated by the process of the present invention contains thiocyanate ion, in an amount less than about that stoichiometrically necessary to theoretically combine with the extractable metals as the simple thiocyanate salts. This thiocyanate ion in solution in the aqueous phase can be derived from any source other than the quaternary ammonium thiocyanate compound. For the purposes of the invention, the minimum concentration of thiocyanate ion should be at least about 1 to about 3 milligrams per liter of aqueous solution. Advantageously, the molar concentration of thiocyanate ion is about 50 to about 95% or even up to 110% of the stiochimetric amount as calculated by the relationships set forth hereinbefore. If amounts of thiocyanate ion significantly in excess of the defined stoichiometric amount are used, the disadvantage occurs that thiocyanate ion will pass through the system into the aqueous raffinate where it can constitute an undesirable impurity and source of economic loss. Thiocyanate ion can be supplied to the aqueous feed either prior to or contemporaneous with extraction by means of any water-soluble thiocyanate, for example, sodium thiocyanate, ammonium thiocyanate, potassium thiocyanate, calcium thiocyanate, etc. Economics dictates the use of the cheapest material.

In order to give those skilled in the art a fuller understanding and appreciation of the invention, the following examples are given:

EXAMPLE I

This example is described in conjunction with FIG. 1 of the drawing. Referring now thereto a sulfate nickel process solution having a pH of about 3 and containing about 10 grams per liter (gpl) of nickel, about 1 gpl of cobalt, about 0.02 gpl of copper, about 0.008 gpl of zinc and about 0.006 gpl of ferric iron is introduced into the depicted system through conduit 11 into mixing zone 12. The nickel process solution is mixed in mixing zone 12 with about 95% of the stoichiometric quantity of thiocyanate ion necessary to combine with the extractable metals cobalt, copper, zinc and iron. The mixed solution is then passed through conduit 14 into extraction zone 15. Extraction zone 15 can comprise one or more units such as mixer-settlers wherein contact can be made and maintained for an effective amount of time between an aqueous phase and an organic phase. In extraction zone 15, the nickel process solution now containing thiocyanate ion is contacted with a solution of water immiscible quaternary ammonium thiocyanate in a water immiscible aromatic solvent. This organic solution enters extraction zone 15 by means of conduit 16 and exits through conduit 17. The organic solution loaded with extractable metal passes through conduit 17 into stripping zone 18, is stripped of its metal values therein and returns to extraction zone 15 through conduit 16. The aqueous purified product of extraction zone 15, i.e., the raffinate, exits from extraction zone 15 through conduit 19 and is usually subjected to further processing, e.g., metal recovery, beyond the scope of the present invention.

Organic phase loaded with extracted metal values is treated in stripping zone 18 with an aqueous alkali, e.g., sodium hydroxide, which enters stripping zone 18 through conduit 20. Stripping zone 18 can comprise one or more further mixer settle units. The aqueous product from stripping zone 18 comprising a slurry of water, and precipitated metal hydroxides and containing sodium thiocyanate in solution passes through conduit 21 to filtration and washing zone 22. The liquid comprising an aqueous solution containing thiocyanate ion passes out of zone 22 through conduit 13 and into mixing zone 12. Solids comprising oxides, hydroxides and hydrated oxides of cobalt, copper, zinc and iron and occluded and absorbed water exit from zone 22 by means of conduit 23 for further processing beyond the scope of this invention.

EXAMPLE II

This example is described in conjunction with FIG. 2 of the drawing. Referring now thereto, there is depicted in schematic form an alternative stripping technique to that employed in Example I. As in Example I, the quaternary amine thiocyanate-containing organic phase loaded with extractable metal values enters stripping zone 18A through conduit 17 and after stripping exits through conduit 16 for return to extraction zone 15. Stripping is accomplished however using an aqueous ammoniacal carbonate solution (Caron's Solution) which enters stripping zone 18A through conduit 24. The aqueous product from stripping zone 18A comprising a solution of metal tetra/hexa ammonium metal carbonates exits from zone 18A through conduit 25 and passes into precipitation zone 26. In zone 26 aqueous sodium carbonate entering through conduit 27 reacts with the tetra/hexa ammonium metal carbonates at a temperature of about 85°–105°C. to produce basic metal carbonates in slurry in an aqueous solution of sodium thiocyanate. This slurry exits from zone 26 through conduit 28 and passes into filtration and washing zone 22A. Ammonia and carbon dioxide also produced in zone 26 exit through conduit 29 and pass into recovery zone 30 to be dissolved in water entering recovery zone 30 through conduit 31. The resulting "Caron's solution" then passes through conduit 24 for recycle to stripping zone 18A. Filtered metal carbonates exit from filtration and washing zone 22A through conduit 23A and thiocyanate-containing aqueous solution is recycled to mixing zone 12 through conduit 13A.

EXAMPLE III

A pregnant sulfate leach solution after partial iron removal contained 10 gpl Ni, 0.67 gpl Co, 0.023 gpl Cu, 0.008 gpl Zn and 0.006 gpl Fe. This solution was contacted with 30 volume percent of $R_4N$ SCN (Aliquat thiocyanate) in an aromatic diluent in two counter-current stages at an aqueous to organic phase ratio (A/O) of 10. Ninety-five % of stoichiometric SCN requirement with respect of Co, Cu, Zn and Fe, i.e., 1.32 gpl, was added to the aqueous feed solution prior to this contact.

The phases after the extraction contact analysed in gpl.

|  | Ni | Co | Cu | Zn | Fe | Aliquat | SCN |
|---|---|---|---|---|---|---|---|
| Raffinate | 10 | <.001 | <.001 | <.001 | .001 | 0.04 | .03 |
| Loaded Organic | .01 | 6.7 | .23 | .08 | .06 | | |

The loaded organic was stripped at an organic to aqueous phase ratio (O/A) of 3 in one stage with a solution containing 95% NaOH with respect to the stoichiometry of the loaded metals. The stripped organic analysed 0.25 gpl Co, 0.15 gpl Cu and less than 0.001 gpl of Ni, Zn and Fe. The strip slurry was filtered and the cake washed with water. The cake was dissolved in a $H_2SO_4$ solution at pH = 2.5 producing a solution analysing 120 gpl cobalt. The filtrate and wash water were recycled to the aqueous feed solution. Repeated load/strip cycles has shown that the effect of the barren strip liquor recycle to the aqueous feed to be the same as was found for fresh SCN⁻ addition.

EXAMPLE IV

A sulfate solution contained 10 gpl Ni, 0.43 gpl Co, 0.024 gpl Cu, 0.017 gpl Zn and 0.007 gpl Fe to which 95% SCN⁻ of stoichiometry has been added was contacted at an A/O=10 in two counter-current stages with 10% v/v Aliquat thiocyanate in an aromatic diluent.

The phases after this contact analysed in gpl:

The loaded organic was stripped with Caron's solution (120 gpl NH, 80 gpl $CO_2$) in counter-current contact. The phases analysed in gpl:

|  | Co | Cu | Zn | Fe | SCN⁻ |
|---|---|---|---|---|---|
| Stripped Organic | 0.002 | 0.017 | 0.001 | 0.004 | |
| Strip Liquor | 16.2 | 2.24 | 1.20 | 0.94 | 27.5 |

The strip liquor was boiled to precipitate metal carbonates. The resulting slurry was filtered and washed with water. The dry metal carbonates cake analysed 0.010 percent SCN⁻.

The filtrate and wash water were recycled to the aqueous feed solution and repeated load/strip cycles again showed that the effect of the barren strip liquor recycle to the aqueous to be the same as found for fresh SCN⁻ addition.

EXAMPLE V

An aqueous sulfate nickel process solution containing in solution about 0.5 gpl of cobalt, about 0.05 gpl of divalent copper and about 0.02 gpl each of zinc and ferric iron and about 7 gpl of nickel was subjected to liquid ion exchange extraction using Aliquat thiocyanate in various concentrations in an aromatic solvent. In tests "A" 1.9 moles of thiocyanate ion per mole of extractable metal were added to the aqueous feed. In tests "B" no thiocyanate ion was added to the aqueous feed in accordance with the teachings of U.S. Pat. No. 3,194,652. Table I sets forth data showing the difference in results between tests A and B.

TABLE 1

| Concentration of Aliquat Thiocyanate in Organic Phase (% by volume) | Cobalt in Raffinate (gpl) | Cobalt in Loaded Organic Phase (gpl) | |
|---|---|---|---|
| | | Tests A | Tests B |
| 5 | 0.01 | 0.47 | — |
| 5 | 0.02 | 0.80 | — |
| 5 | 0.03 | 1.1 | — |
| 10 | 0.01 | 1.3 | 0.05 |
| 10 | 0.02 | 2.25 | 0.075 |
| 10 | 0.03 | 2.75 | 0.10 |
| 20 | 0.01 | 3.2 | 0.20 |
| 20 | 0.02 | 5.0 | 0.30 |
| 20 | 0.03 | 6.0 | 0.03 |
| 30 | 0.01 | — | 0.256 |
| 30 | 0.02 | — | 0.40 |
| 30 | 0.03 | — | 0.55 |

The data in Table I shows that the addition of thiocyanate ion to an aqueous feed solution increases the metal extraction coefficient for extractable metals significantly. For example, the addition of 1.9 moles of SCN⁻ per mole of extractable metals (Co, Cu, Zn)

|  | Ni | Co | Cu | Zn | Fe | Aliquat | SCN⁻ |
|---|---|---|---|---|---|---|---|
| Raffinate | 10 | 0.018 | 0.002 | 0.001 | 0.003 | 0.030 | 0.030 |
| Loaded Organic | 0.005 | 3.72 | 0.21 | 0.14 | 0.003 | | | increases the metal extraction coefficient which applies when thiocyanate ion is not added to the aqueous feed solution by a factor of 10. The concentration of thiocyanate and quaternary ammonium ions in the raffinate resulting from the hereindescribed process with the addition of up to 1.9 moles of SCN$^-$ per mole of extractable metals to the aqueous feed solution is about the same for thiocyanate but for quaternary ammonium ion is less than half of that concentration as results from a process where no SCN$^-$ is added to the aqueous feed solution.

Additional experiments over and above those set forth in the foregoing examples have provided data permitting calculation of organic phase compositions, A/O ratios and theoretical number of stages required to reduce about 0.5 gpl Cobalt, 0.05 gpl copper, 0.02 gpl each of zinc and ferric iron in a feed solution to about 0.001 gpl cobalt, and less than 0.001 gpl each of copper, zinc and ferric iron when thiocyanate ion is added to the aqueous feed at the level set forth in Example V and when it is not. The results of these calculations are set forth in Table II.

TABLE II

| Volume % Aliquat Thiocyanate in Organic Phase | A/O | No. of Theoretical Stages Required | SCN$^-$ Addition |
|---|---|---|---|
| 30 | 15 | 3 | Yes |
| 30 | 10 | 2 | Yes |
| 20 | 10 | 2 | Yes |
| 10 | 10 | 3 | Yes |
| 5 | 5 | 3 | Yes |
| 30 | 2 | 3 | No |
| 20 | 1.4 | 3 | No |
| 10 | 0.6 | 3 | No |

The data in Table II shows that practice in accordance with the present invention results in ability to use lower concentrations of reagent in the organic phase, higher ratios of aqueous to organic phase, lower numbers of extraction stages or any combination of these advantageous factors as compared to extracting without addition of thiocyanate ion to the aqueous feed.

Lowering the concentration of R$_4$NSCN extractant in the organic feed solution has two favorable effects on the overall solvent extraction process. First, the viscosity of the organic feed solution decreases rapidly with decreasing concentration of R$_4$NSCN. This not only improves the rate of liquid-liquid separation but also reduced entrainments of organic in the aqueous phases and vice versa. Secondly, the cost of reagents per unit mass of purified nickel is reduced considerably by decreasing the concentration of R$_4$NSCN in the organic feed solution.

EXAMPLE VI

Single contact tests were made using varying A/O ratios and thiocyanate ion additions to an aqueous sulfate solution containing 0.36 gpl cobalt, 0.35 gpl copper, 0.066 gpl zinc, 0.46 gpl magnesium, 0.027 gpl manganese, 0.60 gpl sodium, 0.008 gpl iron and 2.45 gpl nickel. The organic phase used as to the extractant consisted of 30% by volume Aliquat thiocyanate in Shell TS-34. The temperature was 22°±2°C. The results of analysis of the aqueous and organic phases after attainment of equilibrium are set forth in Table III.

TABLE III

Test No. 1
Thiocyanate added (moles SCN/moles (Cu+Co+Zn) ) = 3.04

| A/O | EQUILIBRIUM CONCENTRATIONS (gpl) | | | | | | | |
|---|---|---|---|---|---|---|---|---|
| | Aqueous | | | | | Organic | | |
| | Co | Cu | Zn | Ni | SCN | Co | Cu | Zn |
| 2 | 0.0003 | 0.0002 | — | 2.40 | 0.22 | 0.75 | 0.65 | — |
| 5 | 0.0004 | 0.0002 | — | 2.45 | 0.40 | 2.0 | 1.75 | — |
| 10 | 0.0007 | 0.0003 | — | 2.45 | 0.61 | 3.7 | 3.45 | — |
| 20 | 0.040 | 0.015 | — | 2.40 | 0.86 | 8.0 | 7.25 | — |

Test No. 2
Thiocyanate added (moles SCN/moles (Cu+Co+Zn) ) = 1.85

| A/O | Aqueous | | | | | Organic | | |
|---|---|---|---|---|---|---|---|---|
| | Co | Cu | Zn | Ni | SCN | Co | Cu | Zn |
| 2 | 0.015 | 0.004 | 0.0001 | 2.45 | 0.020 | 0.65 | 0.65 | 0.14 |
| 5 | 0.035 | 0.007 | 0.0001 | 2.45 | 0.028 | 1.6 | 1.7 | 0.32 |
| 10 | 0.045 | 0.010 | 0.0001 | 2.42 | 0.046 | 2.8 | 3.3 | 0.66 |
| 20 | 0.092 | 0.037 | 0.0002 | 2.45 | 0.16 | 6.1 | 7.7 | 1.6 |

Test No. 3
Thiocyanate added (moles SCN/moles (Cu+Cu+Zn) ) = 1.51

| A/O | Aqueous | | | | | Organic | | |
|---|---|---|---|---|---|---|---|---|
| | Co | Cu | Zn | Ni | SCN | Co | Cu | Zn |
| 2 | 0.030 | 0.006 | .0001 | 2.40 | 0.012 | 0.65 | 0.65 | 0.15 |
| 5 | 0.082 | 0.019 | .0002 | 2.43 | 0.010 | 1.4 | 1.6 | 0.32 |
| 10 | 0.12 | 0.030 | .0003 | 2.45 | 0.017 | 2.3 | 3.2 | 0.67 |
| 20 | 0.14 | 0.055 | .0004 | 2.40 | 0.071 | 4.1 | 5.8 | 1.3 |

Test No. 4
No Thiocyanate added

| A/O | EQUILIBRIUM CONCENTRATIONS (gpl) | | | | | | | |
|---|---|---|---|---|---|---|---|---|
| | Aqueous | | | | | Organic | | |
| | Co | Cu | Zn | Ni | SCN | Co | Cu | Zn |
| 2 | 0.091 | 0.017 | — | 2.40 | 0.010 | 0.55 | 0.65 | — |
| 5 | 0.24 | 0.075 | — | 2.45 | — | 0.65 | 1.35 | — |
| 10 | 0.32 | 0.16 | — | 2.40 | — | 0.50 | 1.80 | — |
| 20 | 0.37 | 0.25 | — | 2.40 | — | 0.35 | 2.02 | — |

Table III shows that while the degree of betterment of extraction varies both with the aqueous to organic phase ratio and the amount of thiocyanate ion added to the aqueous phase, the extraction with added thiocyanate ion is always significantly better (compared to no thiocyanate ion addition (Test No. 4) when the aqueous to organic phase ratio exceeds 2. Table III also shows that while the ratios of nickel to cobalt and nickel to copper can be raised significantly in the equilibrium aqueous phase by inclusion of excess thiocyanate ion (compare Test No. 1 with Tests Nos. 2 and 3) this improvement in separation results in an increase in equilibrium aqueous thiocyanate ion concentration (i.e. potential loss of thiocyanate ion in aqueous raffinate) by a factor of from about 5 to 40.

Additional tests wherein cobalt was extracted from a relatively concentrated aqueous solution (i.e. 25 gpl of cobalt) containing two moles of thiocyanate ion for each mole of cobalt into organic phases containing from about 8 to about 25 volume % of Aliquat SCN at about 22°C with an A/O of 5 resulted in loaded equilibrium organic phases having molar ratios of constituents in the ranges as set forth in Table IV.

Table IV

| $R_4N/Co$ | $R_4N/SCN$ | $SCN/Co$ |
|---|---|---|
| 2.05–2.85 | 0.46–0.56 | 3.8–6.2 |

The data in Table IV shows not only the efficient extraction of cobalt in terms of available $R_4N$ species but also that thiocyanate from the aqueous phase is brought into the organic phase in amounts roughly equivalent to the thiocyanate originally present in the organic phase ($R N_4/SCN=1$ for Aliquat thiocyanate).

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a process of extracting metal ions, from aqueous acidic solution having a pH of 2 to 6 using a quaternary ammonium thiocyanate extractant, said metal being extractable into a water immiscible organic medium containing or consisting of said quaternary ammonium thiocyanate extractant, the improvement comprising, having dissolved in the aqueous acidic solution at the time of extraction, thiocyanate ion derived from a source other than said quaternary ammonium thiocyanate in an amount of about 50% to about 110% of that amount stoichiometrically required to combine with said metal ions as defined in moles per liter by the relationship $$[SCN^-] = \Sigma \, a \, [Me^A]$$

wherein $\Sigma$ is the summation operator;

[$Me^A$] is the molar concentration of any given extractable metal species having the positive valence of $A$; and $a$ is a multiplying factor numerically equivalent to $A$.

2. A process as in claim 1 wherein the metal to be extracted is from the group of cobalt, copper, zinc and ferric iron and the relationship defining the approximate maximum thiocyanate ion concentration in moles per liter in said aqueous acidic solution is $$[SCN^-] = 2 \, [Co + Cu + Zn] + 3 \, [Fe].$$

3. A process as in claim 1 wherein the aqueous acidic solution is a nickel-containing sulfate solution.

4. A process as in claim 3 wherein the amount of thiocyanate ion is about 50 to about 95% of the calculated stoichiometric amount.

5. A process as in claim 1 wherein the thiocyanate ion is introduced into the aqueous acidic solution as a water soluble thiocyanate salt.

6. A process as in claim 5 wherein the water soluble thiocyanate salt is selected from the group of ammonium thiocyanate, sodium thiocyanate, potassium thiocyanate and calcium thiocyanate.

7. A process as in claim 1 wherein the quaternary ammonium thiocyanate is dissolved in a water-immiscible aromatic solvent.

8. A process as in claim 7 wherein the quaternary ammonium thiocyanate comprises at least about 5 volume % of the solvent-quaternary ammonium thiocyanate solution.

9. A process as in claim 7 wherein the extraction is a continuous operation in which loaded organic solution is subjected to a stripping operation using an aqueous medium to remove contained metal and to recover and recycle an aqueous phase containing thiocyanate ion and in which stripped extractant is recycled.

10. A process as in claim 9 wherein the extraction is carried out on an aqueous, acidic, nickel-containing sulfate solution.

11. A process as in claim 9 wherein the aqueous medium used in stripping is a solution of a base.

12. A process as in claim 9 wherein the aqueous medium used in stripping is an ammoniacal carbonate solution.

* * * * *